United States Patent [19]
Nishimura et al.

[11] Patent Number: 5,810,979
[45] Date of Patent: Sep. 22, 1998

[54] MAGNETOOPTICAL RECORDING MEDIUM, METHOD FOR PRODUCING THE SAME, METHOD FOR RECORDING OR REPRODUCING INFORMATION IN OR FROM THE SAME

[75] Inventors: Naoki Nishimura, Tokyo; Eiichi Fujii, Yokohama, both of Japan

[73] Assignee: Canon Kabushiki Kaisha, Tokyo, Japan

[21] Appl. No.: 729,763

[22] Filed: Oct. 7, 1996

Related U.S. Application Data

[62] Division of Ser. No. 230,781, Apr. 21, 1994, Pat. No. 5,656,384.

[30] Foreign Application Priority Data

Apr. 23, 1993 [JP] Japan .................................... 5-098024

[51] Int. Cl.⁶ .............................. C23C 14/34; G11B 5/84; G11B 5/66; B05D 1/00
[52] U.S. Cl. ...................... 204/192.2; 427/128; 369/13; 369/272; 369/283; 428/694 RE; 428/694 MM
[58] Field of Search ............................. 369/13, 283, 286, 369/275.4, 275.1, 288; 428/694 MR, 694 SC, 694 MT, 694 RE, 694 MM, 694 EC; 204/192.2; 427/127, 128, 129, 130

[56] References Cited

U.S. PATENT DOCUMENTS

| | | | |
|---|---|---|---|
| 5,428,585 | 6/1995 | Hirokane et al. | 369/13 |
| 5,452,272 | 9/1995 | Murakami et al. | 369/13 |
| 5,547,773 | 8/1996 | Miyakoshi et al. | 428/694 ML |
| 5,563,852 | 10/1996 | Murakami et al. | 369/13 |

FOREIGN PATENT DOCUMENTS

| | | |
|---|---|---|
| 0509836 | 10/1992 | European Pat. Off. . |
| 0524745 | 1/1993 | European Pat. Off. . |
| 0586122 | 3/1994 | European Pat. Off. . |
| 0586175 | 3/1994 | European Pat. Off. . |
| 2-078042 | 3/1990 | Japan . |
| 5-036144 | 2/1993 | Japan . |

OTHER PUBLICATIONS

Patent Abstracts of Japan, vol. 17, No. 438, p. 1591 (Aug. 12, 1993) (Abstract in English of JP 05–089536).

*Primary Examiner*—John J. Zimmerman
*Assistant Examiner*—Michael LaVilla
*Attorney, Agent, or Firm*—Fitzpatrick, Cella, Harper & Scinto

[57] ABSTRACT

A method of producing a magneto-optical recording medium provided with a reproducing layer on a recording film on a substrate, the reproducing film being in-plane magnetized at room temperature and perpendicularly magnetized at an elevated temperature, and the recording film being perpendicularly magnetized at temperatures between room temperature and its Curie temperature. The method includes the steps of forming the reproducing layer on the substrate while applying a magnetic field in a direction parallel to the film surface of the reproducing film which is being formed, and forming the recording film on the reproducing film.

2 Claims, 5 Drawing Sheets

LASER SPOT ically magnetized state above a predetermined temperature
MAGNETOOPTICAL RECORDING MEDIUM, METHOD FOR PRODUCING THE SAME, METHOD FOR RECORDING OR REPRODUCING INFORMATION IN OR FROM THE SAME This application is a division of application Ser. No. 08/230,781 filed Apr. 21, 1994, now U.S. Pat. No. 5,656,384.

BACKGROUND OF THE INVENTION

1. Field of the Invention

The present invention relates to a magnetooptical recording medium for effecting information recording and reproduction with laser light, a method for producing the recording medium, and a method for recording or reproducing information in or from the recording medium.

2. Related Background Art

For rewritable high-density information recording, keen interest is being paid to the magnetooptical recording medium in which information is recorded by forming a magnetic domain in a thin magnetic film with thermal energy of a semiconductor laser and is reproduced by the magnetooptical effect, and, more recently, there is increasing a demand for increasing the recording density of such a magnetooptical recording medium to attain a further increased recording capacity.

The linear recording density of an optical disk, such as the magnetooptical recording medium, is principally determined by the S/N ratio of the reproducing layer, and is significantly dependent on the frequency of the signal bit train, the wavelength of the laser employed in the reproducing optical system, and the numerical aperture of the objective lens.

More specifically, once the wavelength $\lambda$ of the laser of the reproducing optical system and the numerical aperture NA of the objective lens are given, the bit frequency f of the detection limit is determined by the following equation:

$$f=\lambda/2NA$$

On the other hand, the track density is principally limited by the crosstalk, which is principally determined by the distribution (profile) of the laser beam on the medium surface and can also be represented by a function of $(\lambda/2NA)$ as in the case of the bit frequency mentioned above. Consequently, for achieving a higher density in the conventional optical disk, it is necessary to shorten the wavelength of the laser in the reproducing optical system and to increase the numerical aperture NA of the objective lens.

However, there are certain limits in such reduction of the wavelength of the laser and increase in the numerical aperture.

SUMMARY OF THE INVENTION

In consideration of the foregoing, the object of the present invention is to provide a magnetooptical recording medium capable of increasing the recording density irrespective of the wavelength of the laser or the numerical aperture of the objective lens, a method for producing such recording medium, and an information record/reproducing method for such recording medium.

The above-mentioned object can be attained, according to the present invention, by a magnetooptical recording medium provided with plural thin films, including at least a reproducing layer and a recording layer, on a substrate and adapted to effect information recording and reproduction with laser light, wherein the reproducing layer comprises a magnetic film which assumes a horizontally (in-surface) magnetized state at room temperature but assumes a vertically magnetized state above a predetermined temperature higher than the room temperature, wherein the magnetization in the horizontally magnetized state is free from vertical orientation including in the magnetic wall, while the recording layer comprises a magnetic film which assumes a vertically magnetized state at room temperature and above said predetermined temperature.

The above-mentioned object is also attained, according to the present invention, by a method for producing a magnetooptical recording medium provided with plural thin films, including at least a reproducing layer and a recording layer, on a substrate and adapted to effect information recording and reproduction with laser light, comprising:
 a step of forming a reproducing layer on the substrate;
 a step of applying a magnetic field in the film surface direction upon film formation; and
 a step of forming a recording layer on the substrate.

The above-mentioned object is also attained by an information recording method on a magnetooptical recording medium provided, on a substrate, at least with a reproducing layer which assumes a horizontally magnetized state at room temperature but assumes a vertically magnetized state above a predetermined temperature higher than the room temperature, wherein the magnetization in the horizontally magnetized state is free from vertical orientation, including the magnetic wall thereof, and a recording layer which assumes a vertically magnetized state at room temperature and above said predetermined temperature, comprising:
 a step of irradiating the medium with laser light to heat the reproducing layer at least to said predetermined temperature, thereby rendering the reproducing layer as a vertically magnetized film and causing the same to effect exchange coupling with the recording layer;
 a step of applying an external magnetic field of perpendicular direction to the portion, irradiated with the laser light, of the medium; and
 a step of applying an external magnetic field of horizontal (in-surface) direction weaker than the above-mentioned external field.

The above-mentioned object can further be attained by an information reproducing method for a magnetooptical medium provided, on a substrate, at least with a reproducing layer which assumes a horizontally magnetized state at room temperature but assumes a vertically magnetized state above a predetermined temperature higher than the room temperature, wherein the magnetization in the horizontally magnetized state is free from vertical orientation, including the magnetic wall thereof, and a recording layer which assumes a vertically magnetized state at room temperature and above said predetermined temperature, comprising:
 a step of applying an external magnetic field of the horizontal direction to said medium;
 a step of irradiating the medium with laser light from the side of the reproducing layer of the medium to heat the reproducing layer at least to said predetermined temperature, thereby rendering the reproducing layer as a vertically magnetized film, thus causing the same to effect exchange coupling with the recording layer and transferring the information, recorded in the recording layer, to the reproducing layer; and
 a step of detecting the reflected light of the laser light thereby reading the information transferred to the reproducing layer.

BRIEF DESCRIPTION OF THE DRAWINGS

FIGS. 1A and 1B are schematic cross-sectional views of magnetooptical recording medium of the present invention, wherein FIG. 1A is a view showing the magnetized state of a recording layer and a reproducing layer while FIG. 1B is a view showing configuration of layers;

FIGS. 7A and 7B are schematic views showing the magnetooptical reproducing method, wherein FIG. 7A shows a case employing the magnetooptical recording medium of the present invention, while FIG. 7B shows a case employing a conventional magnetooptical recording medium in which magnetic domains are formed in the reproducing layer.

DETAILED DESCRIPTION OF THE PREFERRED EMBODIMENTS

The magnetooptical recording medium of the present invention is provided, on a substrate, at least with a first magnetic layer (reproducing layer) which assumes the state of a horizontally (in-plane) magnetized film at room temperature but assumes the state of a vertically magnetized film above a predetermined temperature higher than the room temperature, and a second magnetic layer (recording layer) which assumes the state of a vertically magnetized film at room temperature and above said predetermined temperature, with a Curie temperature lower than that of the first magnetic layer.

Figure 1A:
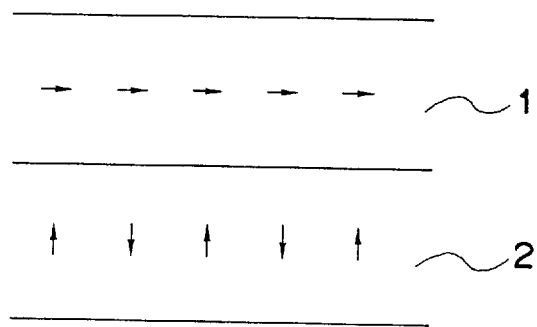
Figure 1B:
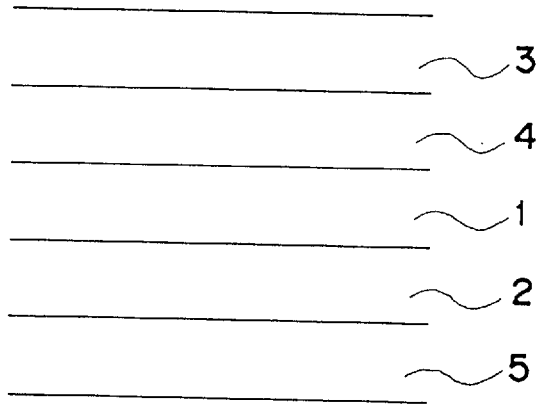
Figure 2:
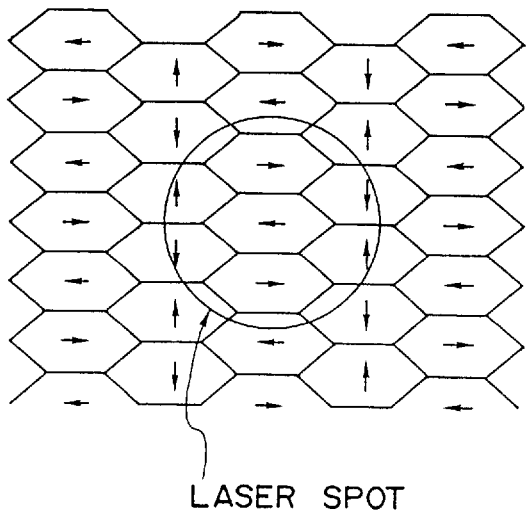
FIG. 2 is a schematic view showing magnetic domains in the reproducing layer of a conventional magnetooptical recording medium.
Figure 3A:
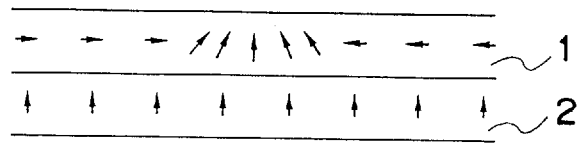
FIGS. 3A and 3B are schematic views showing the state of magnetic wall when magnetic domains are formed in the reproducing layer in a conventional magnetooptical recording medium.
Figure 3B:
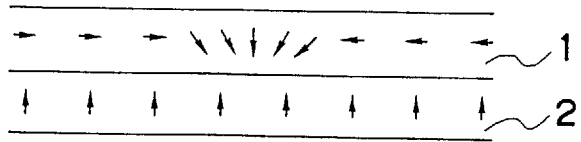
Figure 4A:
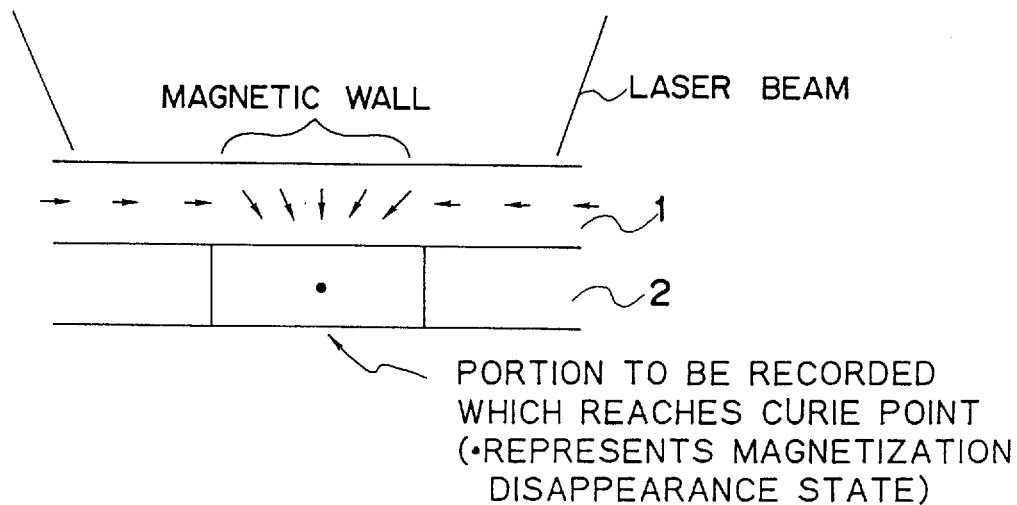
FIGS. 4A and 4B are schematic views showing the state of magnetization when magnetic domains are formed in the recording layer by the magnetic domains formed in the reproducing layer in a conventional magnetooptical recording medium.
Figure 4B:
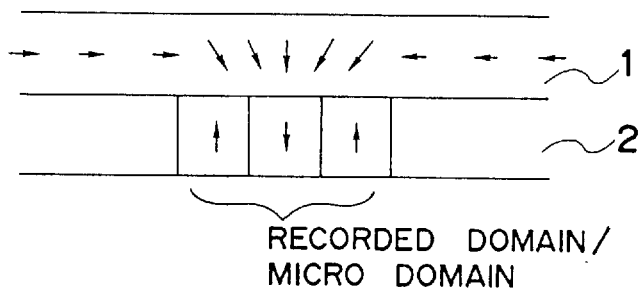
Figure 5A:
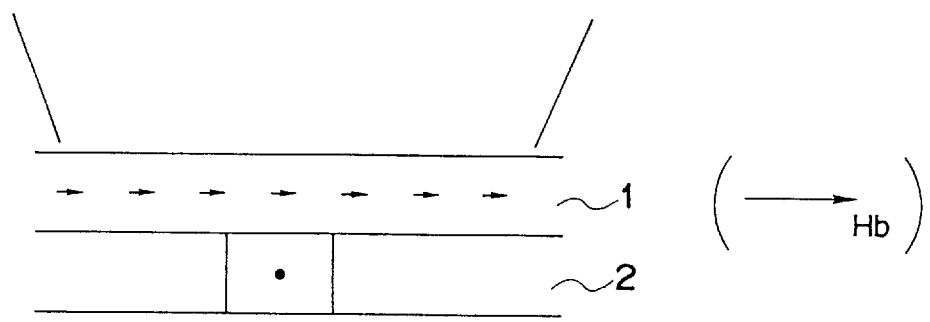
FIGS. 5A and 5B are schematic views showing the state of magnetization when magnetic domains are formed in the recording layer by a one-directional magnetic domain of the reproducing layer in the magnetooptical recording medium of the present invention.
Figure 5B:
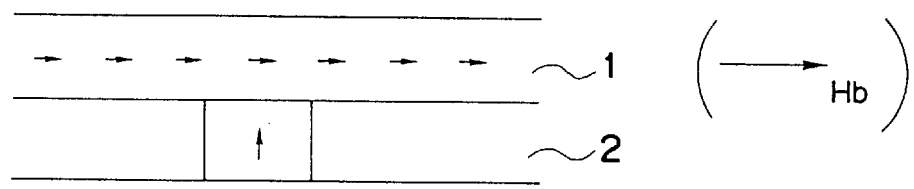
Figure 6:
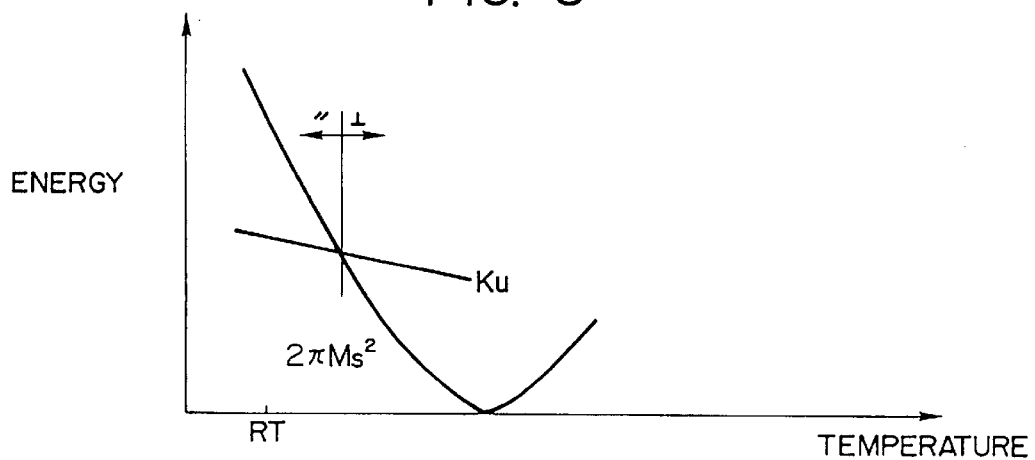
FIG. 6 is a chart showing the temperature-dependent change of demagnetizing energy $2\pi Ms^2$ and vertical magnetic anisotropic energy Ku of the reproducing layer.
Figure 7A:
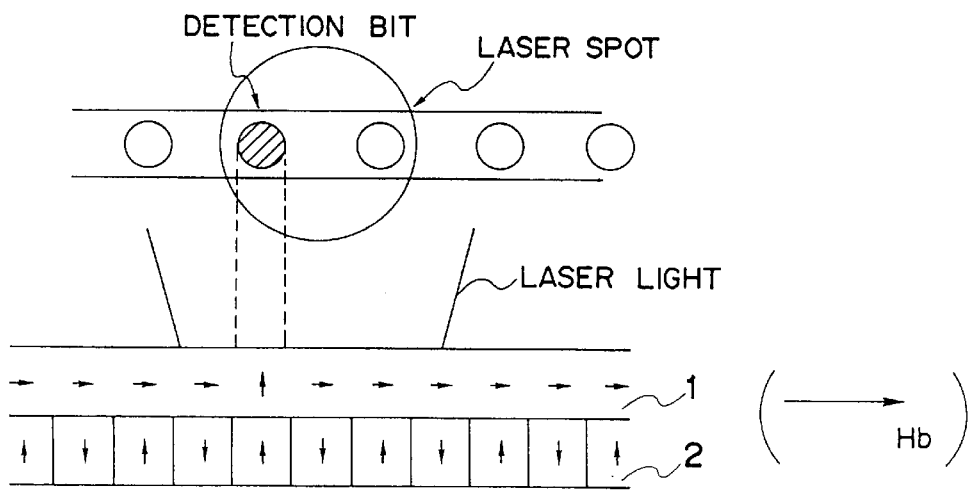
Figure 7B:
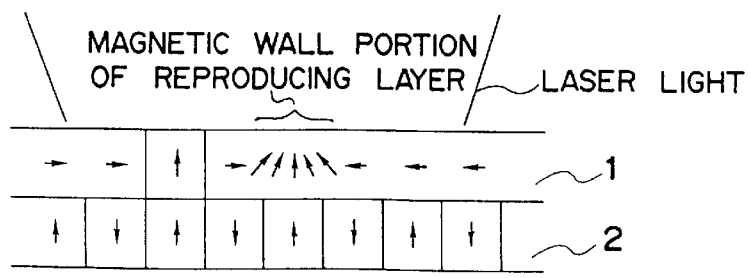

In the following the present invention will be clarified in detail, with reference to the attached drawings, in which FIGS. 1A and 1B are schematic views showing the configuration of layers of the magnetooptical recording medium of the present invention, FIG. 2 is a schematic view showing the state of magnetic domains in case that magnetic domains are formed in the reproducing layer in a conventional magnetooptical recording medium, FIGS. 3A and 3B are schematic views showing the state of magnetic wall in case that magnetic domains are formed in the reproducing layer in a conventional magnetooptical recording medium, FIGS. 4A and 4B are schematic views showing the state of magnetization in case that magnetic domains are formed in the recording layer by the magnetic domains formed in the reproducing layer in a conventional magnetooptical recording medium, FIGS. 5A and 5B are schematic views showing the state of magnetization in case that magnetic domains are formed in the recording layer in the presence of a one-directional magnetic domain in the reproducing layer, FIG. 6 is a chart showing the temperature-dependent change of demagnetizing energy $2\pi Ms^2$ and vertical magnetic anisotropic energy Ku of the reproducing layer, and FIGS. 7A and 7B are schematic views showing the magnetooptical reproducing method.

(1) Structure and composition of medium

The reproducing layer of the magnetooptical recording medium of the present invention is preferably composed of a material having a compensation temperature between the room temperature and the Curie temperature, for example an amorphous rare earth-iron group alloy, such as GdCo, GdFeCo, GdTbFeCo, GdDyFeCo or NdGdFeCo. Magnetization of the reproducing layer in the horizontally magnetized state is free from vertical orientation, including the magnetic wall.

The recording layer is preferably composed of a material having large vertical magnetic anisotropy and capable of stably maintaining the magnetized state, for example an amorphous rare earth-iron group alloy such as TbFeCo, DyFeCo or TbDyFeCo; a garnet; a periodically structured platinum group-iron group film such as Pt/Co or Pd/Co; or a platinum group-iron group alloy such as PtCo or PdCo.

These magnetic layers may additionally contain an element such as Cr, Ti or Pt for improving corrosion resistance. Also, in addition to these magnetic layers, there may be provided a dielectric layer for example of SiN, $AlN_x$, $AlO_x$, $TaO_x$, or $SiO_x$ in order to increase the interference effect.

Furthermore, for improving the thermal conductivity, there may be added a layer for example of Al, AlTa, AlTi or Cu. Furthermore, there may be additionally provided an intermediate layer for regulating the exchange coupling force or the statomagnetic coupling force, or an auxiliary layer for assisting the recording or reproduction. Furthermore there may be added a protective coated layer consisting of a dielectric material as mentioned above or of polymer resin.

In the following there will be explained the recording and reproducing methods of the present invention.

(2) Data recording

At first data signal is recorded in the recording layer of the magnetooptical recording medium of the present invention, as shown in FIG. 1A. The recording is achieved either by modulation of an external magnetic field under the irradiation of laser light of a power capable of heating the recording layer at least to the Curie temperature, or, after information erasure, by modulation of laser power under the application of a magnetic field in the recording direction.

In this operation, if the intensity of the laser light is so determined, in consideration of the linear velocity of the recording medium, that only a pre-determined area of the recording layer within the light spot reaches the Curie temperature or the vicinity thereof, there can be formed a recorded magnetic domain smaller than the diameter of the light spot, so that the signal can be recorded with a frequency below the diffraction limit of the light.

The reproducing layer in horizontally magnetized state may form recycling magnetic domains as shown in FIGS. 2, 3A and 3B, in order to reduce the demagnetizing energy.

The boundary of such magnetic domains may be in a state where the magnetic moment rotates horizontally (Nail magnetic wall), or a state where the magnetic moment rotates vertically (Bloch magnetic wall) as shown in FIGS. 3A and 3B.

In the recording operation, if a portion to be recorded of the recording layer is adjacent to the magnetic wall of the reproducing layer as shown in FIGS. 4A and 4B, the vertically oriented magnetization of the reproducing layer influences the magnetization generating process in the recording layer, thereby facilitating the formation of inverted magnetization within the magnetic domain of the recording layer. Formation of such uneven magnetic domain (such as a microdomain) increases the noise in the reproducing process, thereby hindering accurate readout of the recorded information.

In contrast, in the present invention, the reproducing layer is one-directionally magnetized as shown in FIGS. 5A and 5B, or, even in the presence of a magnetic wall, the magnetization therein is maintained horizontally. Consequently the recording layer is maintained free from undesirable influence from the magnetic wall, and does not generate microdomains. For this reason the magnetic domains can be formed in proper manner.

(3) Data reproduction

At the data reproduction, the recording medium is irradiated with reproducing laser light from the side of the reproducing layer, whereby the irradiated portion becomes heated. Since the recording medium is moved with a constant velocity, there is generated a temperature distribution in the moving direction of the medium, whereby a part within the light spot reaches a high temperature.

In a single-layered magnetic film, it is already known that the main direction of magnetization is determined by an effective vertical magnetic anisotropy constant $K\perp$ defined by:

$$K\perp = Ku - 2\pi Ms^2$$

wherein Ms is the saturation magnetization and Ku is the vertical magnetic anisotropy constant. A vertically magnetized film or a horizontally magnetized film is obtained respectively when $K\perp$ is positive or negative. $2\pi Ms^2$ indicates the demagnetizing energy.

The reproducing layer of the present invention is a horizontally magnetized film at the room temperature (RT) because, as shown in FIG. 6;

$$Ku < 2\pi Ms^2, K\perp < O.$$

However, at the reproducing operation, it becomes a vertically magnetized film because the heating reduces Ms of the reproducing layer, thus drastically reducing $2\pi Ms^2$ and inverting the relationship with Ku as:

$$Ku > 2\pi Ms^2, K\perp > O.$$

When such thin magnetic film is laminated directly on a horizontally magnetized film or via an intermediate layer, the apparent Ku varies due to the influence of the exchange coupling force or the statomagnetic coupling force from these layers, but there can still be attained the horizontally magnetized state at the room temperature and the vertically magnetized state at the elevated temperature even when laminated with other layers, by suitably selecting the temperature range of vertical magnetization in the single-layered film higher or lower according to the above-mentioned influence. Thus, by laminating the recording layer consisting of the vertically magnetized film with the reproducing layer of which direction of magnetization varies from horizontal direction to vertical direction, only a high temperature portion of the light spot assumes the state of vertical magnetization to cause exchange coupling between the recording and reproducing layers, whereby the magnetization of the recording layer is transferred. It is therefore rendered possible, by detecting the reflected light of the irradiating laser light, to reproduce the signal with a frequency below the diffraction limit of the light.

Also in the present invention, as the reproduction can be achieved without the influence of bits adjacent in the track or radial direction, the signals recorded with an increased linear recording density and an increased track density can be reproduced with a satisfactory C/N ratio.

In the foregoing explanation, the layers are assumed to be magnetically coupled by exchange coupling, but they may also be magnetically coupled by statomagnetic coupling. Furthermore where may be provided an intermediate layer of a different Curie temperature, for achieving sharper signal transfer.

In the above-explained data reproducing process, a Bloch magnetic wall eventually present in the reproducing layer within the light spot as shown in FIG. 7B may generate a vertically magnetized component in the mask area, thus causing a noise in the data reproduction. In the present invention, however, such noise generation does not occur because the reproducing layer is one-directionally magnetized, without magnetic wall, at least within the laser spot as shown in FIG. 7A.

The above-mentioned one-directionally magnetized state, as explained in (2) data recording and (3) data reproduction, can be attained by a uniaxial anisotropy obtained by the application of a horizontal magnetic field at the film formation, or by the application of a horizontal magnetic field to the portion irradiated with the laser light at the recording or reproducing operation.

The magnitude of such magnetic field to be horizontally applied should be so large as to one-directionally orient the horizontal magnetization but so small as not to detrimentally influence the magnetic domain formation at the recording operation, by the inclination of the magnetizations of the recording and reproducing layers toward the horizontal direction.

Also the state free from a magnetic wall having vertical magnetization in the reproducing layer, or the state of recording or reproduction in which the magnetization of the reproducing layer is oriented in a horizontal direction, only needs to be realized at least within the laser light spot.

In the following the present invention will be further clarified by examples thereof, but it is to be understood that the present invention is by no means limited by such examples.

[EXAMPLE 1]

Targets of Si, Tb, Gd, Fe and Co were mounted in a DC magnetron sputtering apparatus, then a polycarbonate substrate was fixed on a substrate holder, and the chamber was evacuated with a cliopump to high vacuum of $1 \times 10^{-6}$ Pa or less.

After the introduction of Ar gas to 0.4 Pa, there were formed, in succession, a SiN interference layer of a thickness of 780 Å, a GdFeCo reproducing layer, a TbFeCo recording layer and a SiN protective layer of a thickness of 700 Å to obtain a configuration shown in FIG. 1B.

The SiN layer was formed with DC reactive sputtering under the introduction of $N_2$ gas in addition to Ar gas. The GdFeCo layer and TbFeCo layer were formed by applying DC power to the Gd, Fe, Co and Tb targets.

The GdFeCo reproducing layer had a thickness of 400 Å and such a composition as to have the compensation temperature at 280° C. and the Curie temperature at 350° C. or higher.

The TbFeCo recording layer had a thickness of 400 Å and such a composition as to be TM rich at the room temperature and to have the compensation temperature below the room temperature and the Curie temperature at 220° C.

Thus prepared magnetooptical recording medium was subjected to the following measurement of record/reproducing characteristics.

The measuring apparatus employed an objective lens with N.A.=0.55, and a laser wavelength of 780 nm.

The recording operation was conducted with a power of 8–10 mW, and a linear velocity of 9 m/s (revolution 2400 rpm, radius 36 mm). A carrier signal of 5.8–15 MHz was recorded in the recording layer by the magnetic field modulation method with a recording magnetic field of ±150 Oe, under the application of a horizontal auxiliary magnetic field of 20 Oe, and the dependence of C/N ratio on the recording frequency was investigated. The reproducing power was so adjusted as to maximize the C/N ratio. The obtained results are shown in Table 1.

[EXAMPLE 2]

A magnetooptical recording medium was prepared on a polycarbonate substrate by forming a GdFeCo reproducing layer and a TbFeCo recording layer in a similar manner as in the example 1. However, the TbFeCo recording layer had a thickness of 300 Å and such a composition as to be TM rich at the room temperature and to have the compensation temperature below the room temperature and the Curie temperature at 240° C.

This magnetooptical recording medium was subjected to the recording of a carrier signal of 8–15 MHz under the application of a horizontal magnetic field and the signal reproduction, in a similar manner as in the example 1, except that the recording magnetic field was 160 Oe and the horizontal auxiliary magnetic field was 50 Oe. The reproducing power was so adjusted as to maximize the C/N ratio. The obtained results are shown in Table 1.

[EXAMPLE 3]

On a polycarbonate substrate, there were formed in succession, a SiN interference layer of a thickness of 780 Å, a GdFeCo reproducing layer, a DyFeCo recording layer and a SiN protective layer of a thickness of 700 Å in a similar manner as in the example 1. At the formation of the reproducing layer, an external magnetic field of 500 Oe was applied horizontally, in order to generate a uniaxial magnetic anisotropy in the horizontal direction.

The GdFeCo reproducing layer had a thickness of 400 Å and such a composition as to have the compensation temperature at 270° C. and the Curie temperature at 350° C. or higher.

The DyFeCo recording layer had a thickness of 300 Å and such a composition as to be TM rich at the room temperature and to have the compensation temperature below the room temperature and the Curie temperature at 200° C. The recording magnetic field was ±150 Oe, and the reproducing power was so adjusted as to maximize the C/N ratio. The obtained results are shown in Table 1.

[EXAMPLE 4]

On a polycarbonate substrate, there were formed, in succession, a SiN interference layer of a thickness of 780 Å, a GdFeCo reproducing layer, a TbFeCo recording layer, and a SiN protective layer of a thickness of 700 Å in a similar manner as in the example 1.

The GdFeCo reproducing layer had a thickness of 400 Å and such a composition as to have the compensation temperature at 260° C. and the Curie temperature at 350° C. or higher.

The TbFeCo recording layer had a thickness of 400 Å and such a composition as to be TM rich at the room temperature and to have the compensation temperature below the room temperature and the Curie temperature at 200° C. The recording magnetic field was ±150 Oe. The reproduction was conducted under the application of a weak horizontal magnetic field of about 15 Oe, and the reproducing power was so adjusted as to maximize the C/N ratio. The obtained results are shown in Table 1.

[REFERENCE EXAMPLE 1]

The example 1 was reproduced in the preparation of the magnetooptical recording medium and in the measurement of record/reproducing characteristics, however, without the application of the auxiliary horizontal magnetic field in the film formation, recording or reproducing operation. The recording magnetic field was ±150 Oe, and the reproducing power was so adjusted as to maximize the C/N ratio. The obtained results are shown in Table 1.

TABLE 1

[C/N measurements]

| | Reproducing layer | | Recording layer | | Horizontal Mag. field (Oe) | | | C/N (dB) | | |
|---|---|---|---|---|---|---|---|---|---|---|
| | | | | | Upon | | | Min. bit length | | |
| | Composition | Thickness (Å) | Composition | Thickness (Å) | Forming Reproducing Layer | Upon Recording | Upon Reproducing | 0.3 μm | 0.4 μm | 0.5 μm |
| Ex.1 | GdFeCo | 400 | TbFeCo | 400 | 0 | 20 | 0 | 33 | 43 | 46 |
| 2 | GdFeCo | 400 | TbFeCo | 300 | 0 | 40 | 0 | 30 | 42 | 45 |
| 3 | GdFeCo | 400 | DyFeCo | 400 | 500 | 0 | 0 | 32 | 40 | 44 |
| 4 | GdFeCo | 400 | TbFeCo | 400 | 0 | 0 | 15 | 32 | 42 | 45 |
| Ref. Ex.1 | GdFeCo | 400 | TbFeCo | 400 | 0 | 0 | 0 | 24 | 37 | 42 |

What is claimed is:

1. A method for producing a magneto-optical recording medium provided with a reproducing film and a recording film on a substrate, said reproducing film being in-plane magnetized at room temperature and perpendicularly magnetized at an elevated temperature, said recording film being perpendicularly magnetized at temperatures between room temperature and its Curie temperature, said method comprising the steps of:

forming the reproducing film on the substrate while applying a magnetic field in a direction parallel to the film surface of the reproducing film which is being formed; and forming the recording film on the reproducing film.

2. A method according to claim 1, wherein said reproducing film and said recording film are formed by sputtering.

* * * * *

UNITED STATES PATENT AND TRADEMARK OFFICE
CERTIFICATE OF CORRECTION

PATENT NO. : 5,810,979

DATED : September 22, 1998

INVENTOR(S) : NAOKI NISHIMURA, ET AL.

It is certified that error appears in the above-identified patent and that said Letters Patent is hereby corrected as shown below:

COLUMN 1:

Line 44, "$\lambda/2N\Lambda$" should read --$\lambda/2NA$--.

Figure 4B:
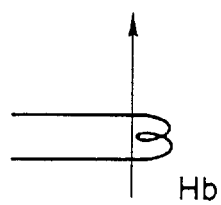
Figure 5B:
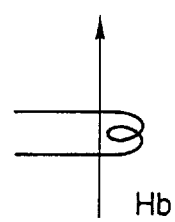

COLUMN 3:

Line 11, "FIGS. 4$\Lambda$" should read --FIGS. 4A--; and
Line 16, "FIGS. 5$\Lambda$" should read --FIGS. 5A--.

COLUMN 4:

Line 20, "$\Lambda 1N_x, \Lambda 1O_x,$" should read --$A1N_x, A1O_x,$--; and
Line 23, "$\Lambda 1, \Lambda 1Ta, \Lambda 1Ti$" should read --$A1, A1Ta, A1Ti$--.

COLUMN 7:

Line 29, "$\Lambda t$" should read --At--.

UNITED STATES PATENT AND TRADEMARK OFFICE
CERTIFICATE OF CORRECTION

PATENT NO. : 5,810,979

DATED : September 22, 1998

INVENTOR(S) : NAOKI NISHIMURA, ET AL.

It is certified that error appears in the above-identified patent and that said Letters Patent is hereby corrected as shown below:

<u>COLUMN 8</u>:

Line 64, "Λ" should read --A--.

Signed and Sealed this

Thirteenth Day of July, 1999

Attest:

Q. TODD DICKINSON

*Attesting Officer*  Acting Commissioner of Patents and Trademarks